United States Patent
Chen

(10) Patent No.: US 6,687,516 B2
(45) Date of Patent: Feb. 3, 2004

(54) HAND-FREE RECEIVER SIGNAL WIRE FOR MOBILE TELEPHONE

(75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 405 days.

(21) Appl. No.: 09/750,077

(22) Filed: Dec. 29, 2000

(65) Prior Publication Data

US 2001/0001765 A1 May 24, 2001

Related U.S. Application Data

(63) Continuation of application No. 09/168,283, filed on Oct. 8, 1998.

(51) Int. Cl.[7] .................................................. H04M 1/00
(52) U.S. Cl. ..................................... 455/569.1; 455/559
(58) Field of Search ................................. 455/569, 450, 455/557, 550, 575, 90, 552, 553, 344, 345, 570, 559, 573; 379/446, 454, 455, 388.01, 390.01, 406.06, 430, 447

(56) References Cited

U.S. PATENT DOCUMENTS

| | | | | |
|---|---|---|---|---|
| 5,170,067 A | * | 12/1992 | Baum et al. ................. 307/10.1 |
| 5,212,722 A | * | 5/1993 | Murata ......................... 455/570 |
| 5,535,274 A | * | 7/1996 | Braitberg et al. ............ 379/446 |
| 5,673,001 A | * | 9/1997 | Kim et al. ................... 330/284 |
| 5,783,926 A | * | 7/1998 | Moon et al. ................. 320/106 |
| 5,794,163 A | * | 8/1998 | Paterson et al. ............ 455/568 |
| 5,870,615 A | * | 2/1999 | Bar-On et al. .............. 713/310 |
| 6,064,177 A | * | 5/2000 | Dixon ......................... 320/111 |
| 6,076,000 A | * | 6/2000 | Lee ............................. 455/569 |
| 6,349,223 B1 | * | 2/2002 | Chen ........................... 455/569 |

\* cited by examiner

*Primary Examiner*—Curtis Kuntz
*Assistant Examiner*—Barry W Taylor
(74) *Attorney, Agent, or Firm*—Troxell Law Office PLLC

(57) ABSTRACT

A signal wire connecting between a hand-free receiver and a mobile telephone includes a first side having a hand-free receiver plug co-operating with the hand-free receiver so as to be connected to the main circuit of the hand-free receiver, and a second side having a mobile telephone plug co-operating with the output receptacle of the mobile telephone so as to be connected to the mobile telephone. In such a manner, the mobile telephone plug includes a voltage control leg provided with a first branch resistor which is adapted to match the power supply circuit of the hand-free receiver to obtain the exact voltage supply value of the mobile telephone, which can be outputted to the power supply input leg of the mobile telephone to function as the power supply of the mobile telephone. In addition, the mobile telephone plug includes a mobile telephone voice output leg provided with a second branch resistor which is adapted to output the voice from the mobile telephone to the voice signal of the input side of the voice amplifying circuit of the hand-free receiver so as to obtain a determined value of the voice signal such that the voice amplifying circuit of the hand-free receiver operates precisely.

6 Claims, 5 Drawing Sheets

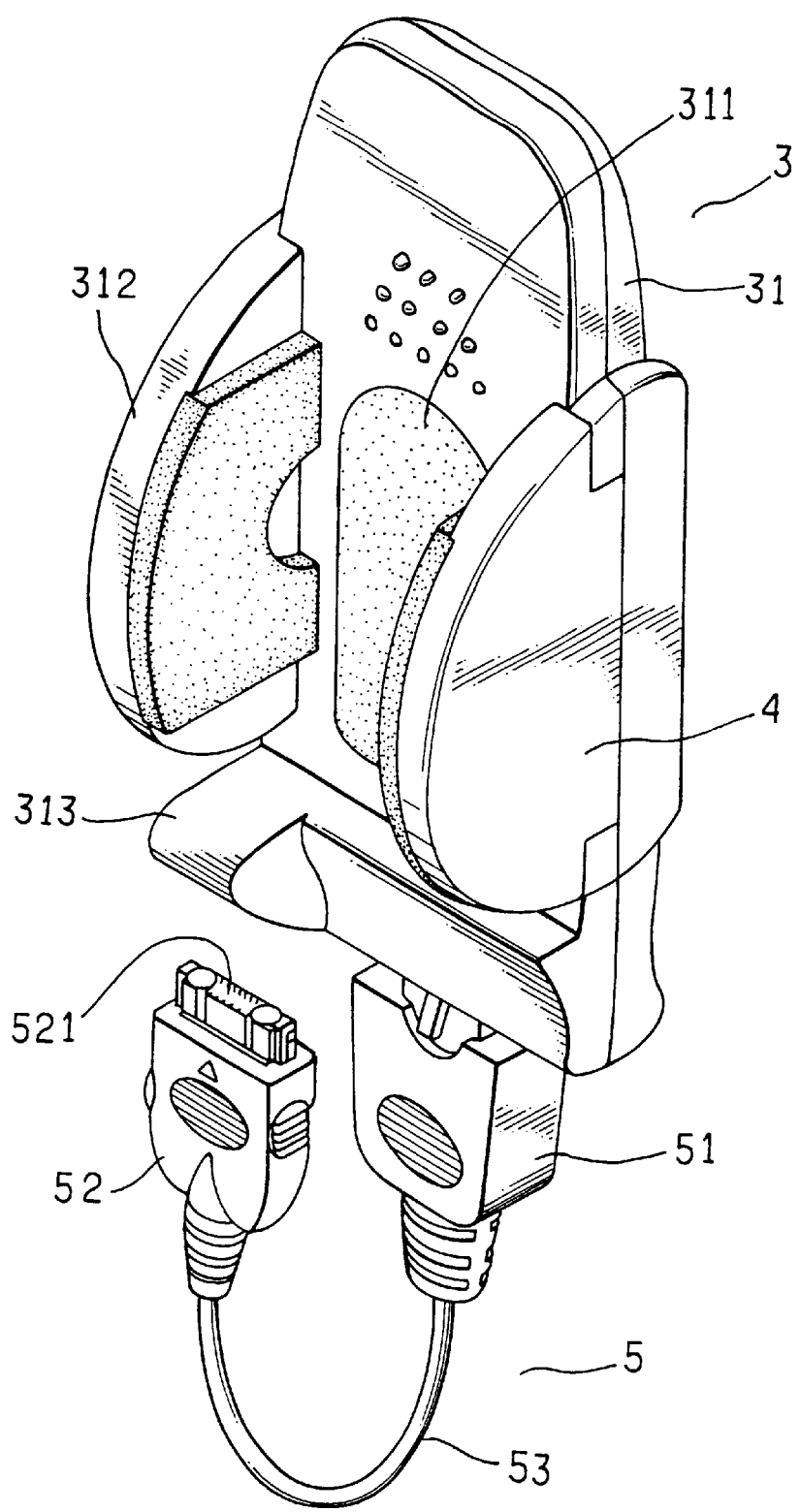
F I G. 2

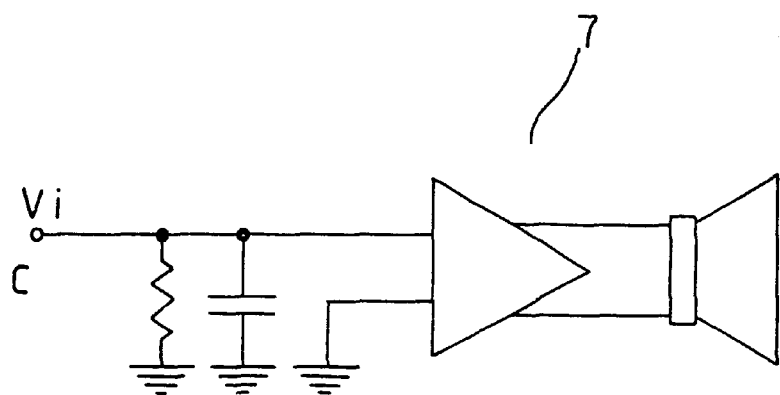
F I G. 5
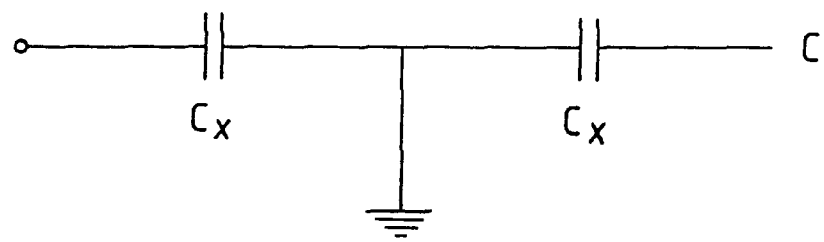
F I G. 6

HAND-FREE RECEIVER SIGNAL WIRE FOR MOBILE TELEPHONE

This application is a continuation of Ser. No. 09/168,283 filed on Oct. 8, 1998.

BACKGROUND OF THE INVENTION

1. Field of the Invention

The present invention relates to an improvement in a signal wire of a hand-free receiver for a mobile telephone.

2. Description of the Related Prior Art

A conventional hand-free receiver 1 is shown in FIG. 1, and can be used for holding a mobile telephone 2 such that the mobile telephone 2 can be used in the car. However, the volume, the signal connecting receptacle and the working voltage of the mobile telephone 2 are variable because it is made by different factories so that it has to provide hand-free receivers of different types so as to suit mobile telephones of various types, thereby increasing the manufacturing cost. A hand-free receiver with a common type of receiving base has been developed, however, it still cannot solve the following problems:

(1) Different types of mobile telephones will need different power supply voltages.

(2) Different types of mobile telephones will need different kinds of signal output plugs.

(3) Different types of mobile telephones will need different voice output powers.

SUMMARY OF THE INVENTION

The primary objective of the present invention is to provide a signal wire connecting between a hand-free receiver and a mobile telephone, the signal wire including a first side comprising a hand-free receiver plug co-operating with the hand-free receiver so as to be connected to the main circuit of the hand-free receiver, and a second side comprising a mobile telephone plug co-operating with the output receptacle of the mobile telephone so as to be connected to the mobile telephone.

By such an arrangement, the mobile telephone plug includes a voltage control leg provided with a first branch resistor which is adapted to match the power supply circuit of the hand-free receiver to obtain the exact voltage supply value of the mobile telephone, which can be outputted to the power supply input leg of the mobile telephone to function as the power supply of the mobile telephone. In addition, the mobile telephone plug includes a mobile telephone voice output leg provided with a second branch resistor which is adapted to output the voice from the mobile telephone to the voice signal of the input side of the voice amplifying circuit of the hand-free receiver so as to obtain a determined value of the voice signal such that the voice amplifying circuit of the hand-free receiver operates precisely.

Further objectives and advantages of the present invention will become apparent after a careful reading of the detailed description with appropriate reference to the accompanying drawings.

BRIEF DESCRIPTION OF THE DRAWINGS

FIG. 2 is a perspective view of a signal wire of a hand-free receiver for a mobile telephone according to the present invention;

FIG. 5 is a circuit diagram of a voice amplifying standard circuit of the hand-free receiver as shown in FIG. 2; and FIG. 6 is a schematic diagram of a branch capacitor of the voice amplifying standard circuit as shown in FIG. 5.

DETAILED DESCRIPTION OF THE PREFERRED EMBODIMENTS

Figure 1:
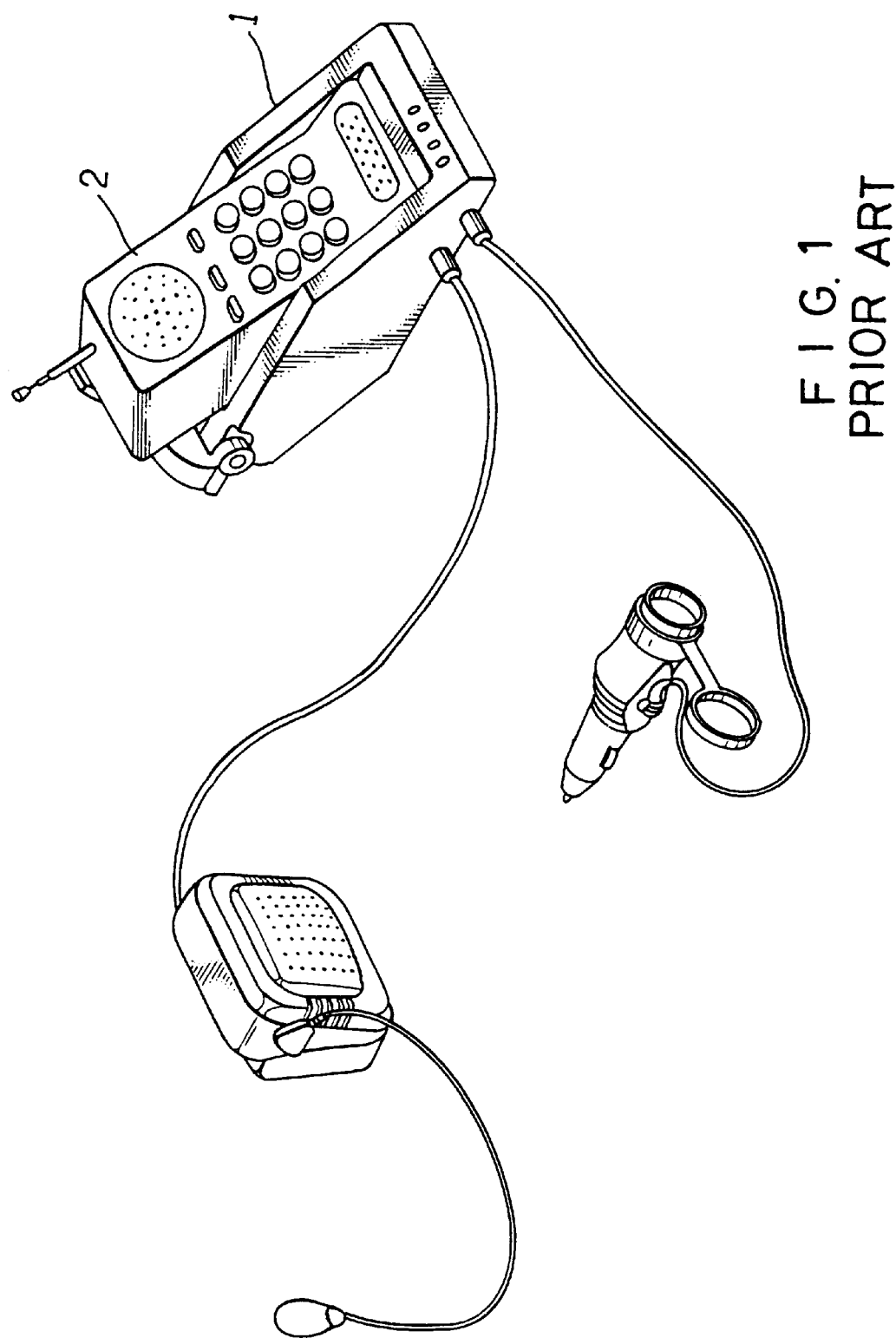
FIG. 1 is a perspective view of a hand-free receiver for a mobile telephone according to the prior art.
Figure 3:
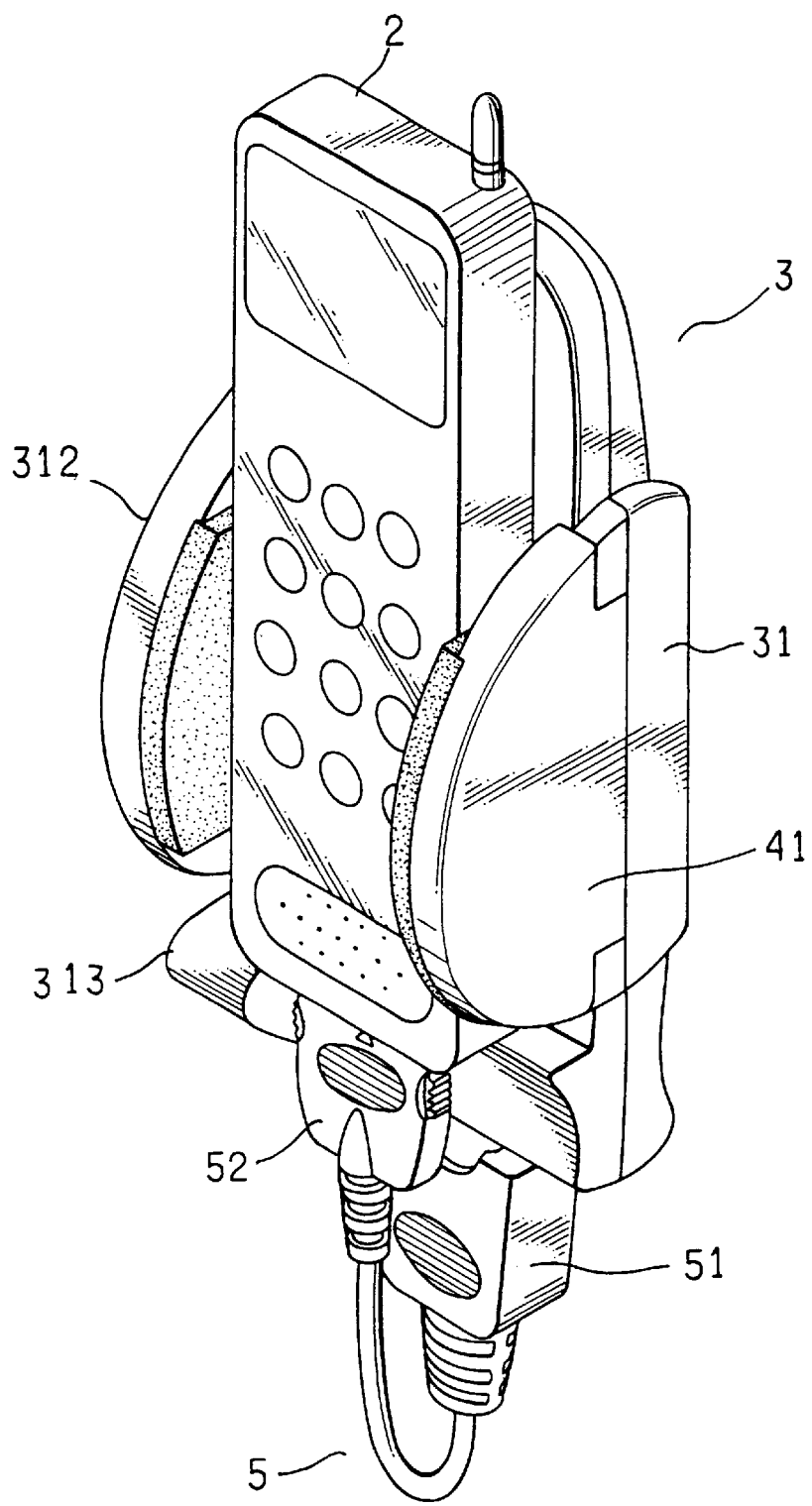
FIG. 3 is a perspective view of a signal wire of a hand-free receiver for a mobile telephone according to the present invention.

With reference to FIGS. 2 and 3, a signal wire 5 according to the present invention is connected between a hand-free receiver 3 and a mobile telephone 2.

Figure 4:
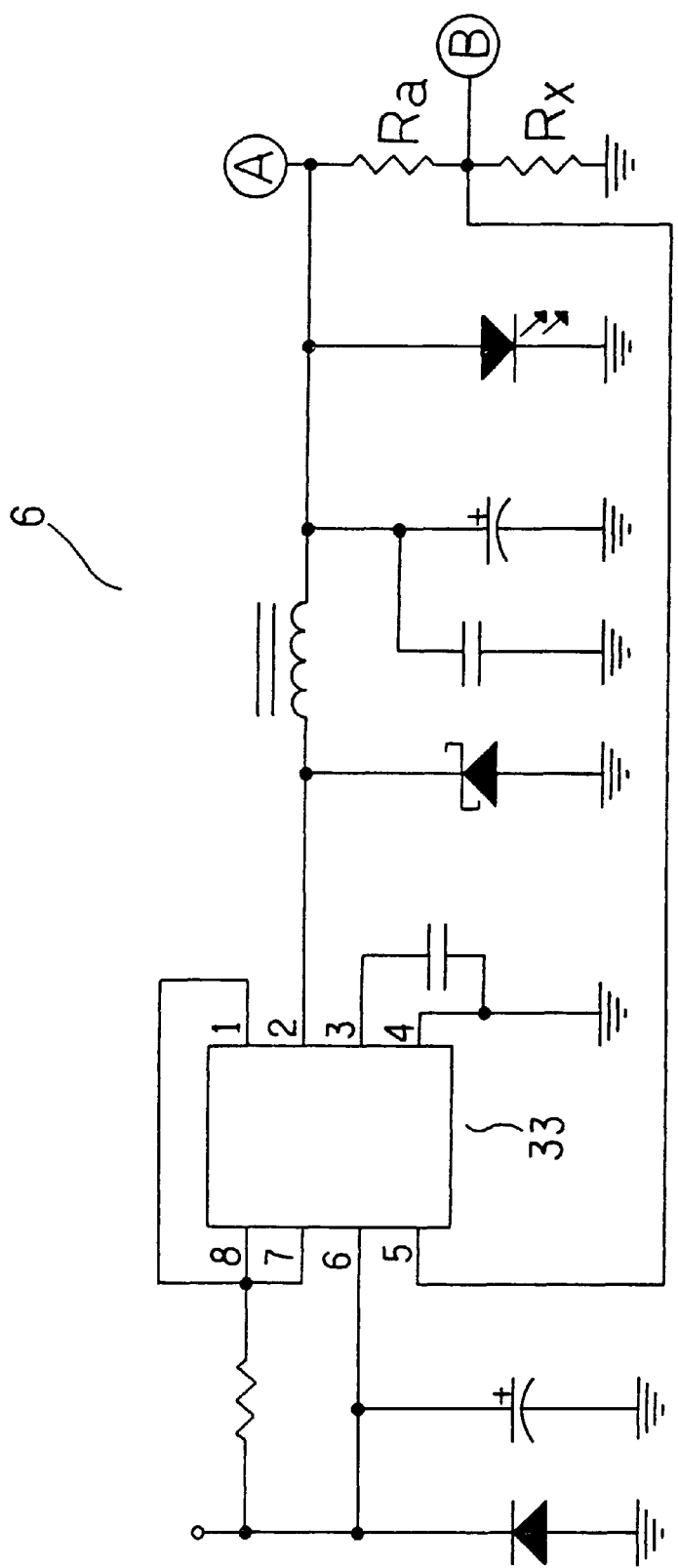
FIG. 4 is a circuit diagram of a power supply standard circuit of the hand-free receiver as shown in FIG. 2.

The hand-free receiver 3 comprises a base 31 having a receiving space 311 for receiving the mobile telephone 2, an extension arm 312, 313 formed on one side and the bottom side of the base 31, and provided with a horn and a microphone therein, and a clamping mechanism 4 located opposite to extension arm 312 for holding the mobile telephone 2. The base 31 is provided with a hand-free receiver main circuit comprising a power supply standard circuit 6 and a voice amplifying standard circuit 7 as shown in FIGS. 4 and 5.

The signal wire 5 includes a flexible wire 53 having a first side comprising a hand-free receiver plug 51 co-operating with the hand-free receiver 3 so as to be connected to the main circuit of the hand-free receiver 3, and having a second side comprising a mobile telephone plug 52 co-operating with the output receptacle of the mobile telephone 2 so as to be connected to the mobile telephone 2. The mobile telephone plug 52 includes a conductor 521 aligning with each of the output points of the output receptacle of the mobile telephone 2. The conductor 521 is arranged to align with the function levels of various types of mobile telephone 2. The mobile telephone plug 52 includes a line aligning with the voltage level of the mobile telephone 2 and provided with a replaceable voltage control branch resistor $R_x$. The mobile telephone plug 52 also includes a line aligning with the voice level of the mobile telephone 2 and provided with a or a set of replaceable branch resistor $R_x$ or $C_x$.

By such an arrangement, the mobile telephone 2 can be placed in the receiving space 311 and can be secured by the clamping mechanism 4. The plug 51 and 52 of the signal wire 5 can be inserted into the corresponding insertion socket of the base 31 of the hand-free receiver 3 and the mobile telephone 2 respectively so as achieve the function of hand-free operation.

When the mobile telephone 2 of different type is used, it is only required to replace a different signal wire 5 so as to provide the power supply matching the mobile telephone 2.

With reference to FIG. FIG. 4, the mobile telephone plug 52 is provided with a voltage control branch resistor $R_x$ aligning with the voltage level of the mobile telephone 2. The voltage control branch resistor $R_x$ is provided in the mobile telephone plug 52. The mobile telephone plug 52 has a proper resistance value $R_x$ depending on the voltage required by different types of mobile telephones 2, such that the output voltage at point A is connected via the signal wire 5 so as to provide the power supply to the mobile telephone 2, wherein $R_a$ is the fixed resistance of the hand-free receiver 3. The voltage at point B varies with the resistance $R_x$, and the output voltage of the integrated circuit 33 of the power supply can be adjusted by changing the input voltage of the fifth leg (leg 5), whereby the voltage at point A can be adjusted and changed by varying the resistance $R_x$ so as to suit different types of mobile telephones.

FIG. 5 shows the circuit diagram of the voice amplifying standard circuit 7 of the hand-free receiver 3, wherein point C is an input side of the voice of the amplifier. When the voice input is greater, the output of the speaker is greater, and when the voice input is smaller, the output of the speaker is smaller such that the voltage $V_i$ at point C has to chosen optimally. FIG. 6 shows the mobile telephone plug 52 also includes a line aligning with the voice level of the mobile telephone 2 and provided with a or a set of replaceable branch resistor $R_x$ or capacitor $C_x$. The mobile telephone plug 52 has a proper capacitance $C_x$ depending on the voltage required by different types of mobile telephones 2 such that the input voice of the voice amplifier of the hand-free receiver has a proper value. The value of the branch capacitor $C_x$ (or resistor $R_x$) of the mobile telephone plug ranges from zero (representing a short circuit) to infinity (representing a shut-off circuit).

Therefore, the signal wire according to the present invention can be adapted to match mobile telephones of different types such that the same hand-free receiver can be suitable for mobile telephones of various types.

Although the present invention has been described with a certain degree of particularity, it is to be understood that the present disclose has been made by way of example only and that many other possible modifications and variations can be made without departing from the scope and spirit of the present invention.

I claim:

1. A signal wire connecting between a hands-free receiver and a mobile telephone, said signal wire comprising a first end having a hands-free receiver plug for connecting to a main circuit of the hands-free receiver, and a second end including a mobile telephone plug for connecting to an output receptacle of the mobile telephone;

said mobile telephone plug including a voltage control leg having a first replaceable voltage control branch resistor adapted to match a power supply circuit of the hands-free receiver to obtain a predetermined voltage supply output at said mobile telephone plug matching a voltage value required by the mobile telephone, wherein said predetermined voltage supply output is input to the mobile telephone to function as a power supply thereof;

said mobile telephone plug including a mobile telephone voice output leg having at least one second replaceable branch resistor adapted to output voice signals from the mobile telephone to an input of a voice amplifying circuit of the hands-free receiver to obtain a predetermined voice signal level at said input of said voice amplifying circuit.

2. The signal wire according to claim 1, wherein said first replaceable voltage control branch resistor has a resistance value selected from a range of values from zero to infinity.

3. The signal wire according to claim 1, wherein the at least one second replaceable branch resistor has a resistance value selected from a range of values from zero to infinity.

4. A signal wire connecting between a hands-free receiver and a mobile telephone, said signal wire comprising a first end having a hands-free receiver plug for connecting to a main circuit of the hands-free receiver, and a second end including a mobile telephone plug for connecting to an output receptacle of the mobile telephone;

said mobile telephone plug including a voltage control leg having a replaceable voltage control branch resistor adapted to match a power supply circuit of the hands-free receiver to obtain a predetermined voltage supply output at said mobile telephone plug matching a voltage value required by the mobile telephone, wherein said predetermined voltage value required by the mobile telephone, wherein said predetermined voltage supply output is input to the mobile telephone to function as a power supply thereof;

said mobile telephone plug including a mobile telephone voice output leg having a branch capacitor adapted to output voice signals from the mobile telephone to an input of a voice amplifying circuit of the hands-free receiver to obtain a predetermined voice signal level at said input of said voice amplifying circuit.

5. The signal wire according to claim 4, wherein said branch capacitor has a capacitance value selected from a range of values from zero to infinity.

6. The signal wire according to claim 4, wherein the replaceable voltage control branch resistor has a resistance selected from a range of values from zero to infinity.

* * * * *